(12) United States Patent
Santelli, Jr.

(10) Patent No.: US 11,837,853 B2
(45) Date of Patent: Dec. 5, 2023

(54) DEVICE AND KIT FOR DISPENSING A WIRE MANAGEMENT

(71) Applicant: Albert Santelli, Jr., Martinsville, NJ (US)

(72) Inventor: Albert Santelli, Jr., Martinsville, NJ (US)

(73) Assignee: Albert Santelli, Jr., Martinsville, NJ (US)

( * ) Notice: Subject to any disclaimer, the term of this patent is extended or adjusted under 35 U.S.C. 154(b) by 262 days.

(21) Appl. No.: 17/188,257

(22) Filed: Mar. 1, 2021

(65) Prior Publication Data

US 2021/0273429 A1  Sep. 2, 2021

Related U.S. Application Data

(60) Provisional application No. 62/982,767, filed on Feb. 28, 2020.

(51) Int. Cl.
*H02G 3/04* (2006.01)
*H02G 3/00* (2006.01)
*H02G 1/00* (2006.01)

(52) U.S. Cl.
CPC ............... *H02G 3/04* (2013.01); *H02G 3/266* (2013.01)

(58) Field of Classification Search
CPC .......... H02G 3/04; H02G 3/263; H02G 3/266; H02G 3/0406; H02G 3/0462; H02G 3/34; F16L 3/012; F16L 3/01; H01B 13/0808; H01B 13/0816; H01B 13/0825
See application file for complete search history.

(56) References Cited

U.S. PATENT DOCUMENTS

| | | | | |
|---|---|---|---|---|
| 4,454,374 | A | 6/1984 | Pollack | |
| 8,334,045 | B2* | 12/2012 | Schaety | H01B 13/085 428/167 |
| 9,164,251 | B2* | 10/2015 | Dickinson | B65H 51/10 |
| 2008/0265076 | A1* | 10/2008 | Petteys | A61B 50/10 242/118 |
| 2013/0098557 | A1* | 4/2013 | Takeuchi | G02B 6/46 156/349 |
| 2016/0380419 | A1* | 12/2016 | Wolf | G02B 6/4459 385/137 |
| 2020/0227904 | A1* | 7/2020 | Borer | H02G 9/025 |

* cited by examiner

*Primary Examiner* — Hoa C Nguyen
*Assistant Examiner* — Amol H Patel
(74) *Attorney, Agent, or Firm* — Calderone Bullock LLC

(57) ABSTRACT

The present invention relates to a device for dispensing a wire management system which can include a dispenser housing. A kit includes the device for dispensing a wire management system, a base and a cover. The base and cover can be individually dispensed from the dispenser housing. After dispensing of a desired length of the base and/or the cover, the respective end of the base and or cover can be pushed back into the dispenser housing to recoil the base and/or the cover back into the dispenser housing.

21 Claims, 22 Drawing Sheets

DEVICE AND KIT FOR DISPENSING A WIRE MANAGEMENT

BACKGROUND OF THE INVENTION

Field of the Invention

The present invention relates in general to wire management for concealing wires and in particular to a device and kit for a dispensing a wire management system.

Description of the Related Art

It is known that electrical the cords of domestic appliances such as clocks and lamps are unsightly and generally hang or run loosely from the appliances to the electrical outlets in a room. U.S. Pat. No. 4,454,374 describes an electric cord holder, which includes a sheath made of an elongated plastic extrusion having a slotted-tubular cross-section so as to define a cord-receiving channel therein. The sheath has a dome-shaped front wall having two ends and a planar rear wall joined to one end of the front wall and extending from the one end of the front wall towards the other end of the front wall. The rear wall has a free end leaving a slot adapted for insertion of an electrical cord into the cord-receiving channel between the free end of the rear wall and the other end of the front wall. The rear wall has an inner face which partially defines the cord-receiving channel and an outer face. The front wall has an overhang depending from the other end thereof which extends beyond the outer face and at least slightly toward the free end of the rear wall. The holder further includes securing means a connected to the outer face of the rear wall and adapted to be attached to an external surface, whereby the electric cord holder may be attached to the external surface with the overhang substantially abutting the external surface.

It is desirable to provide an improved device and kit for dispensing a wire management system in which a base and a cover of the wire management system can be individually dispensed expeditiously as needed.

SUMMARY OF THE INVENTION

The present invention relates to a device and kit for dispensing a wire management system. A device for dispensing a wire management system can include a dispenser housing. For example, the dispenser housing can be a box including an attached openable lid. The lid can snap closed securely and can be opened and closed continually without failure.

A kit includes the device for dispensing a wire management system and the wire management system. The wire management system includes a base and a cover. The base and cover of the wire management system can be individually dispensed from the dispenser housing.

The base of the wire management system can be formed of a rear wall coupled or integral with side walls. A cavity is formed between the rear wall and side walls. An adhesive strip can be attached or coated on an outer surface of the rear wall of the base. An adhesive liner can be placed over the adhesive strip The kit can comprise a roll of the base and a roll of the cover. The roll of the base and the roll of the cover can be received in the dispenser housing. The rolls of the base and the cover can be individually wound in combination with a separation wheel. The separation wheel can be rotated in a clockwise direction to turn the roll of the base and/or the roll of the cover during respectfully dispensing of the base and/or the cover from the dispenser housing. After dispensing of a desired length of the base and/or the cover from the dispenser housing, the respective end of the base and/or cover can be pushed back into the dispenser housing. The separation wheel can rotate in a counterclockwise direction to recoil the base and/or the cover back into the dispenser housing.

In one embodiment, the base is in a flat form within the dispenser housing. During dispensing of the base from the dispenser housing, the base self-forms with a zipping action such that the side walls extend upwardly from the rear wall. The side walls can be latched to lock the side walls to the rear wall. After dispensing of a pre-determined portion of the base, the remaining base, having at least a portion that is not locked, can be received back into the dispenser housing with an un-zipping action in order to flatten the base into a flat form within the dispenser housing.

During use, the base and/or cover can be dispensed from the dispensing wire management system by pulling on a respective end of a roll of the base and/or a roll of the cover. For example, any length of the base and/or the cover can be used. For example, the length of the base or the cover can be in the range of six inches to 25 feet. The base and/or cover can be cut to a pre-determined length to cover various sizes of cords. For example, the cord can be an electrical cord or a cable.

In one embodiment, the base can be dispensed from dispensing the device for dispensing a wire management system in a flat form. The flat form can make it easier to cut the base and provides accuracy for the cut. After cutting of the base, the side walls can be folded upwardly to create a cavity between the side walls. The adhesive liner is removed from the adhesive strip of the base and the adhesive strip is applied to a surface. The cord can be received in the cavity of the base. The cover can be coupled to the base. The cord can be removed from the cavity by sliding off the cover. After removal of the cord, the base can be removed from the surface.

In one embodiment, one or more attachments can be used with the kit. In one embodiment, a wire retainer can be used with the kit.

In one embodiment, the kit provides pulling of the base and/or cover which can be completely formed and ready for use with no waste to allow use of only what is needed. Extra base and/or cover can be pushed back though the dispenser housing and is recoiled back into the dispenser housing ready for the next use.

The roll form of the base and the cover provides for long seamless runs or quick on the spot installations of the wire management system. A handle associated with the dispenser housing allows the dispenser housing to be portable and to be moved to various household projects.

The invention will be more fully described by reference to the following drawings.

DETAILED DESCRIPTION

Figure 1A:
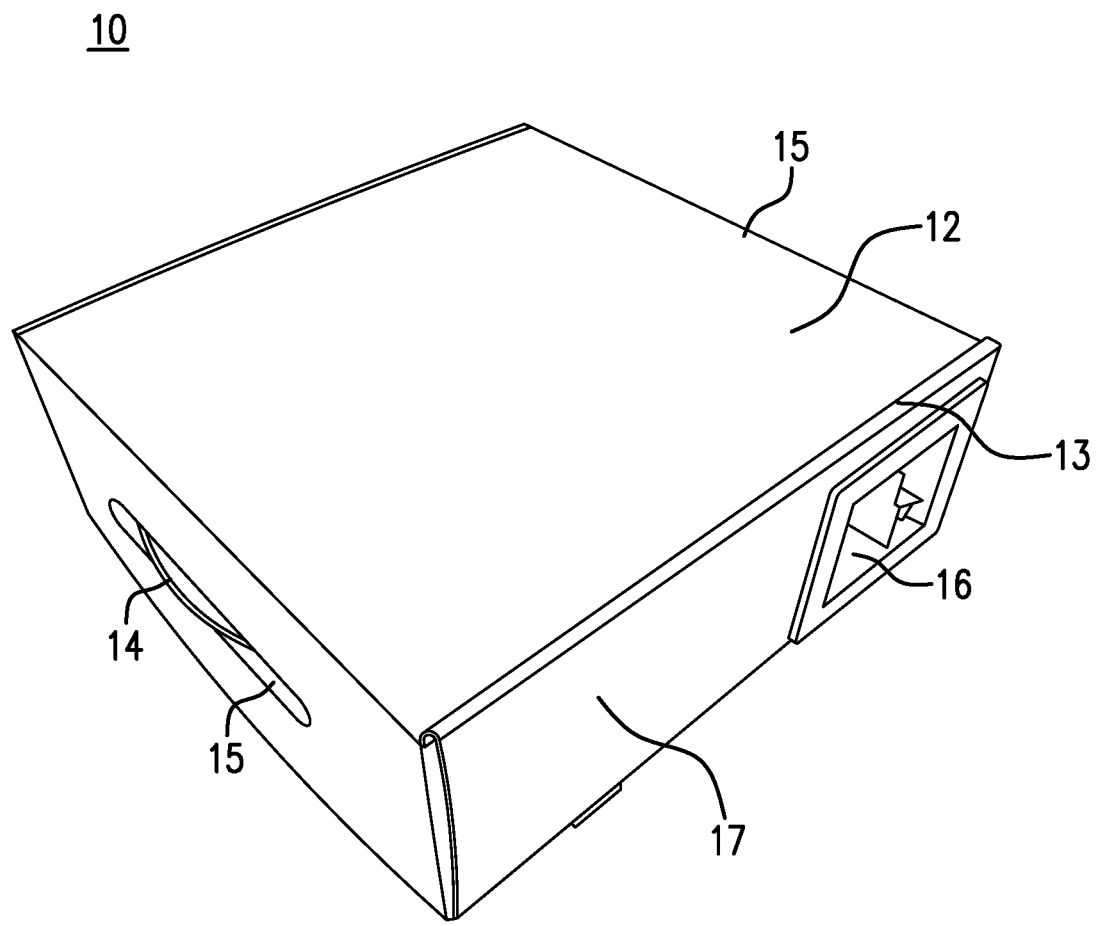
FIG. 1A is a top and side view of a device for dispensing a wire management system in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1B:
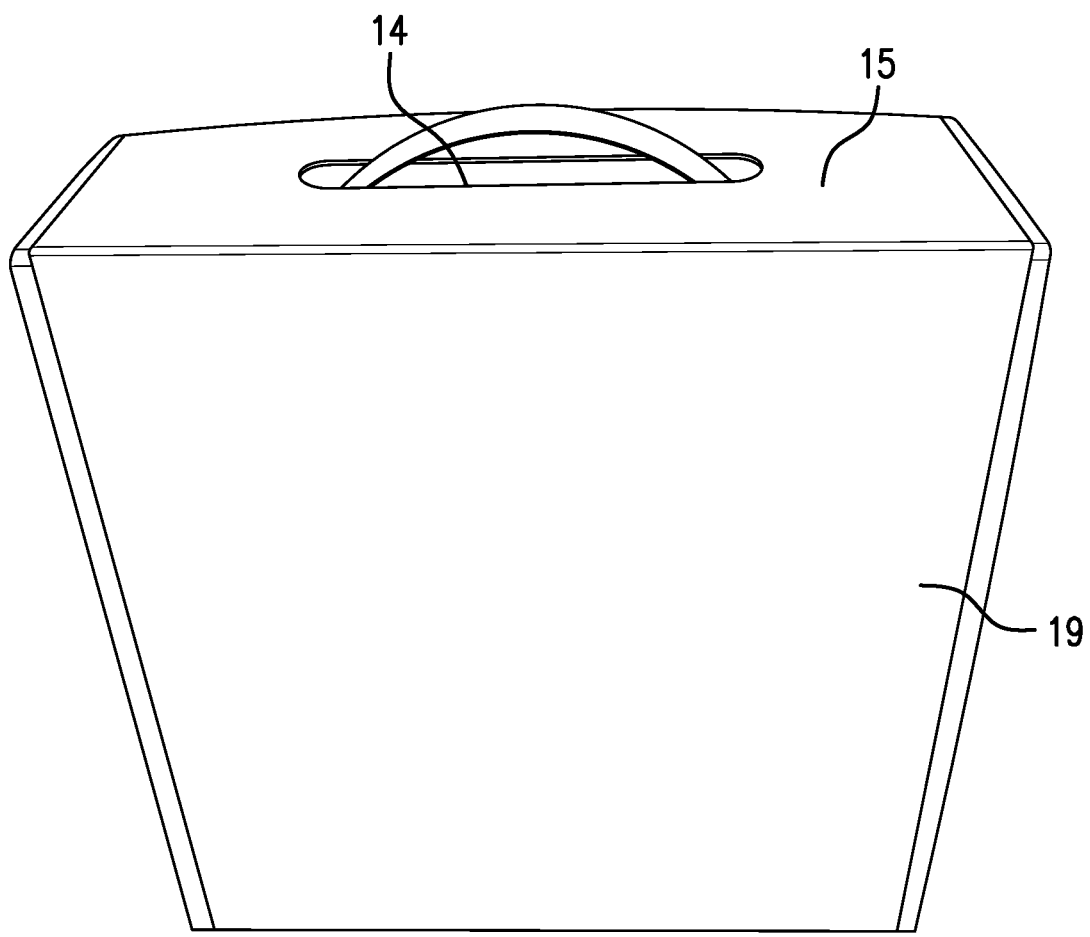
FIG. 1B is a bottom and side view of the device for dispensing a wire management system.

FIGS. 1A-1B illustrate device for dispensing a wire management system 10 in accordance with the teachings of the present invention. Dispenser housing 12 is formed of lid 13, sides 15, front side 17 and bottom 19. Handle 14 can extend from side 15. Dispensing unit 16 is positioned on front side 17. In one embodiment, dispenser housing 12 is a box. A suitable dispenser housing 12 is a box having a length of side 15 of about 12 inches and a length of front side 17 of about 12 inches.

Figure 2A:
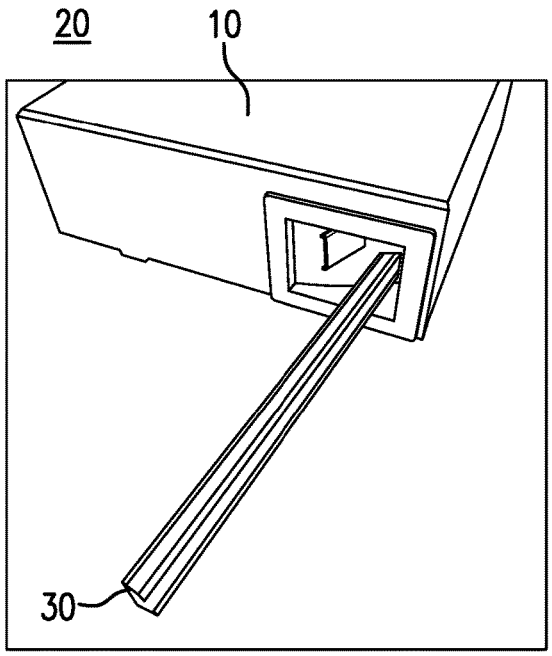
FIG. 2A is a side view of a kit including the device for dispensing a wire management system during dispensing of a cover.
Figure 2B:
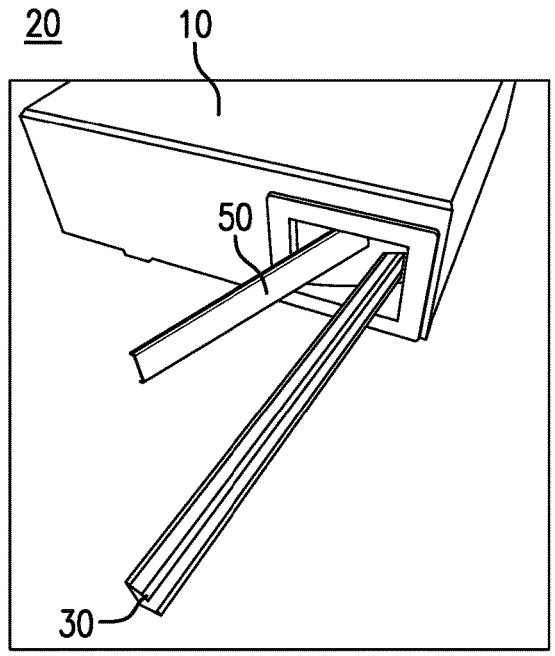
FIG. 2B is a side view of the kit including the device for dispensing a wire management system during dispensing of the cover and a base.
Figure 2C:
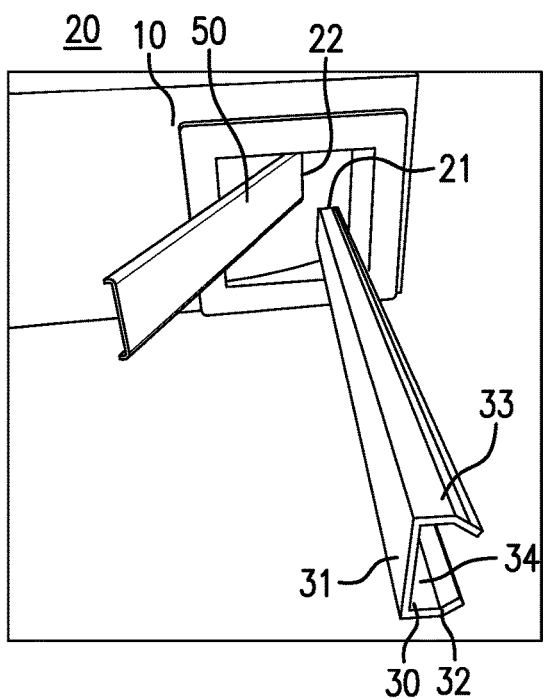
FIG. 2C is a side view of the kit including the device for dispensing a wire management system during dispensing of the cover and the base.

FIGS. 2A-2C illustrate kit 20 including a device for dispensing wire management system 10, base 30 and cover 50. Base 30 and cover 50 can be individually dispensed from dispenser housing 12 of device for dispensing a wire management system 10 through respective openings 21 and 22 of dispensing unit 16.

Base 30 can be formed of rear wall 31 coupled or integral with side wall 32 and side wall 33 as shown in FIG. 2C. Cavity 34 is formed between rear wall 31, side wall 32 and side wall 33. Base 30 can be formed of a rigid material, semi-rigid material or flexible material. For example, base 30 can be formed of rigid polyvinyl chloride (PVC). Alternatively, base 30 can be formed of flexible PVC or urethane. Base 30 can be formed of a colored material. Suitable colored materials include white and beige. Alternatively, base 30 can be painted. In one embodiment, base 30 is made from UL 94 VO rated material. Base 30 can be formed in a standard size, such as in standard sizes of 1 inch wide by ½ inch height.

Cover 50 can be formed of a rigid material, semi-rigid material or flexible material. For example, cover 50 can be formed of rigid polyvinyl chloride (PVC). Alternatively, cover 50 can be formed of flexible PVC or urethane. Cover 50 can be formed of a colored material. Suitable colored materials include white and beige. Alternatively, cover 50 can be painted. In one embodiment, base 30 is made from UL 94 VO rated material.

Figure 3:
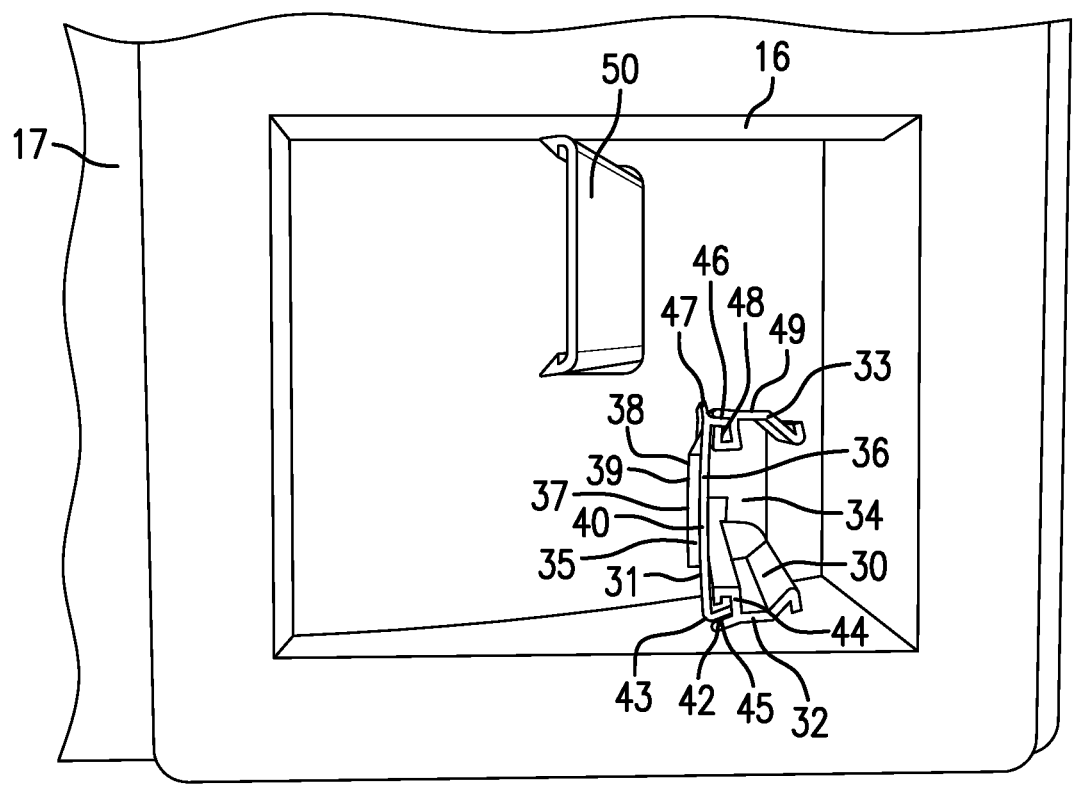
FIG. 3 is side view of the kit including the device for dispensing a wire management system during dispensing of the cover and the base.

Adhesive material 35 is attached or coated on outer surface 36 of rear wall 31 of base 30 as shown in FIG. 3. In one embodiment, adhesive material 35 is a pressure sensitive adhesive strip 37. Side 38 of pressure sensitive adhesive strip 37 is attached to outer surface 36 of rear wall 31. Side 38 can be permanently attached to outer surface 36. Adhesive liner 39 is placed over adhesive strip 37. Adhesive liner 39 is removably attached to side 40 of adhesive strip 37.

In the embodiment shown in FIG. 3, rear wall 31 is coupled to side wall 32 and side wall 33. Coupler 42 can be positioned at end 43 of rear wall 31. Coupler 44 can be positioned at end 45 of side wall 32. Coupler 42 and coupler 44 can have cooperating shapes to engage one another. In one embodiment, coupler 42 and coupler 44 have a "L" shape. Coupler 46 can be positioned at end 47 of rear wall 31. Coupler 48 can be positioned at end 49 of side wall 33. Coupler 46 and coupler 48 can have cooperating shapes to engage one another. In one embodiment, coupler 46 and coupler 48 have a "L" shape. Coupler 42 and coupler 44 can engage one another to latch side wall 32 to rear wall 31. Coupler 46 and coupler 48 can engage one another to latch side wall 33 to rear wall 31. In the latched state, side wall 32 and side wall 33 extend from rear wall 31 and cavity 34 is formed between side wall 32, rear wall 31 and side wall 33.

Figure 4:
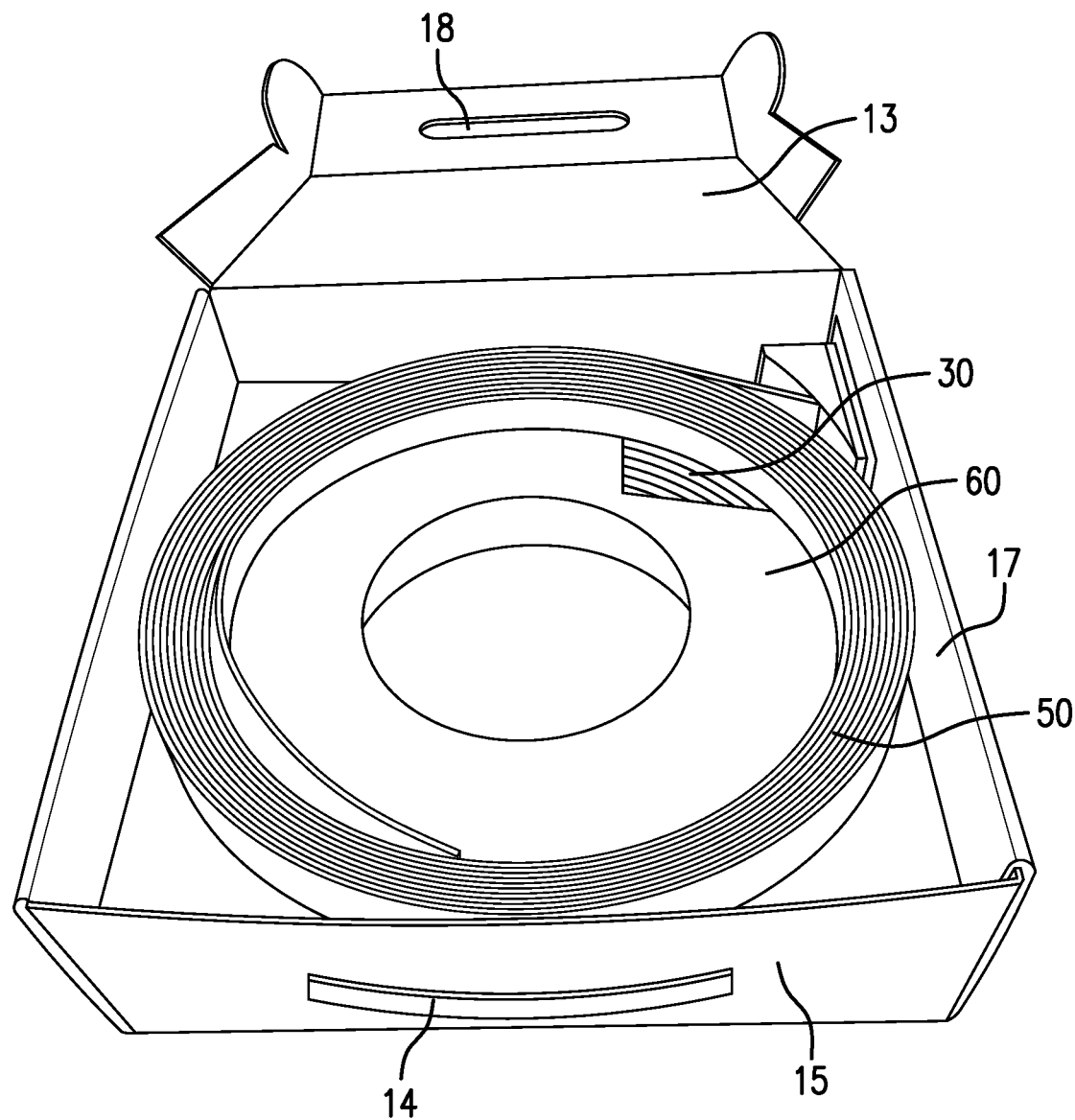
FIG. 4 is a top view of the kit including the device for dispensing a wire management system in an open position.

FIG. 4 is a top view kit 20 including with dispensing wire management system 10 with lid 13 in an open position. Opening 18 is formed in lid 13. In the closed position, shown in FIG. 1B, handle 14 extends through opening 18 to snap close lid 13.

Figure 5:
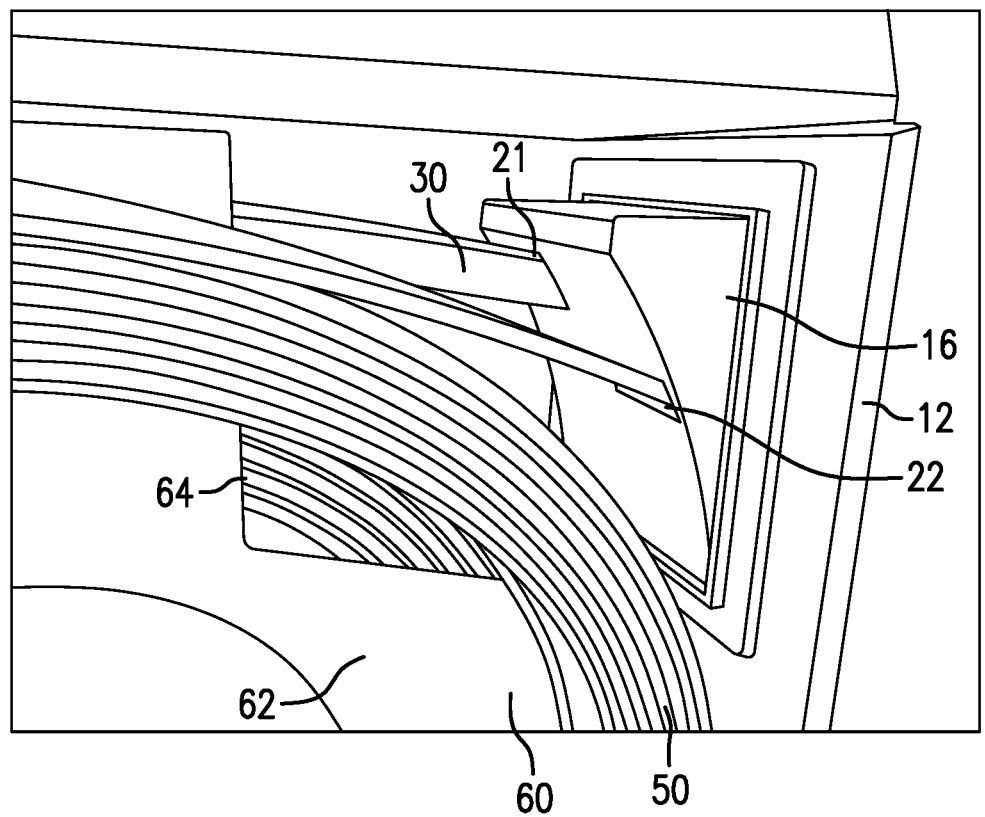
FIG. 5 is a top view of the kit including the device for dispensing a wire management system in an open position during dispensing of the cover and the base.
Figure 6:
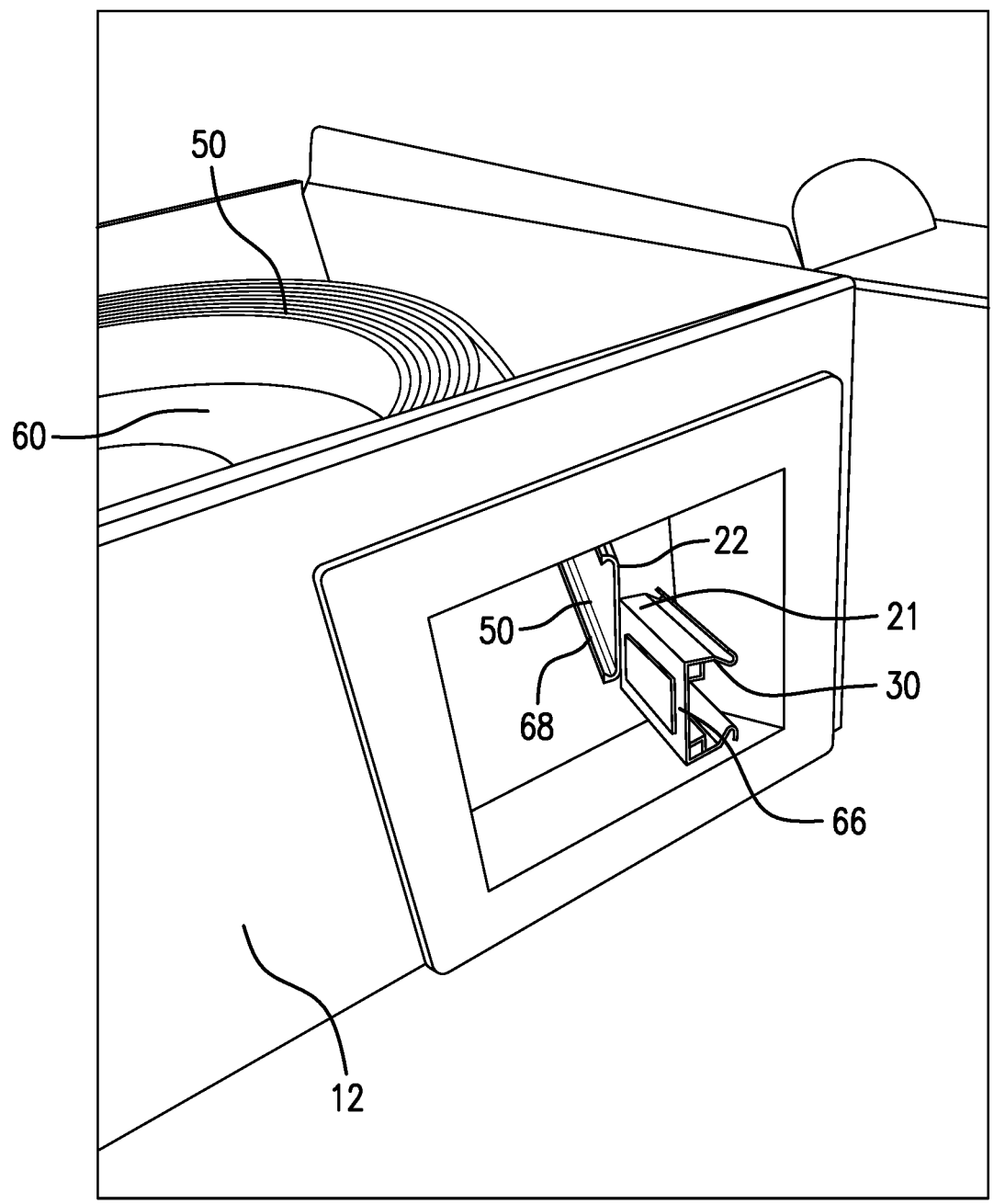
FIG. 6 is a side and top view of the kit including the device for dispensing a wire management system in an open position during dispensing of the cover and the base.

Referring to FIG. 5, base 30 and cover 50 can be received in dispenser housing 12. Base 30 and cover 50 can be individually wound in combination with separation wheel 60. Separation wheel 60 is positioned between base 30 and cover 50. Base 30 is wound and positioned adjacent top surface 62 of separation wheel 60. Cover 50 is wound and positioned adjacent bottom surface 64 of separation wheel 60. Separation wheel 60 can be rotated in a clockwise direction during dispensing of base 30 and/or cover 50 from dispenser housing 12 as shown in FIG. 6. After dispensing of a desired length of base 30, end 66 of base 30 can be pushed back into dispenser housing 12 and separation wheel 60 rotates in a counterclockwise direction to recoil base 30 back into dispenser housing 12. After dispensing of a desired length of cover 50, end 68 of cover 50 can be pushed back into dispenser housing 12 and separation wheel 60 rotates in a counterclockwise direction to recoil cover 50 back into dispenser housing 12.

Figure 7A:
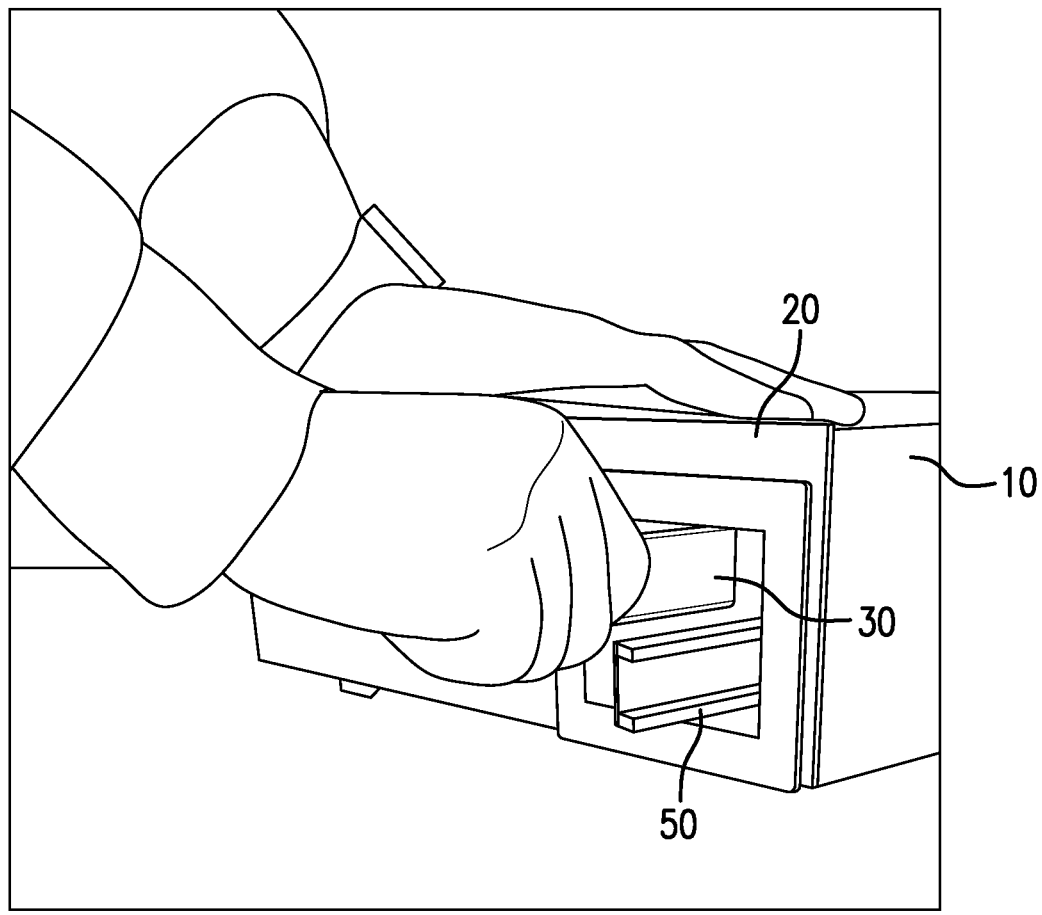
FIG. 7A is a side view of the kit including the device for dispensing a wire management system during use including dispensing of the cover and the base.
Figure 7B:
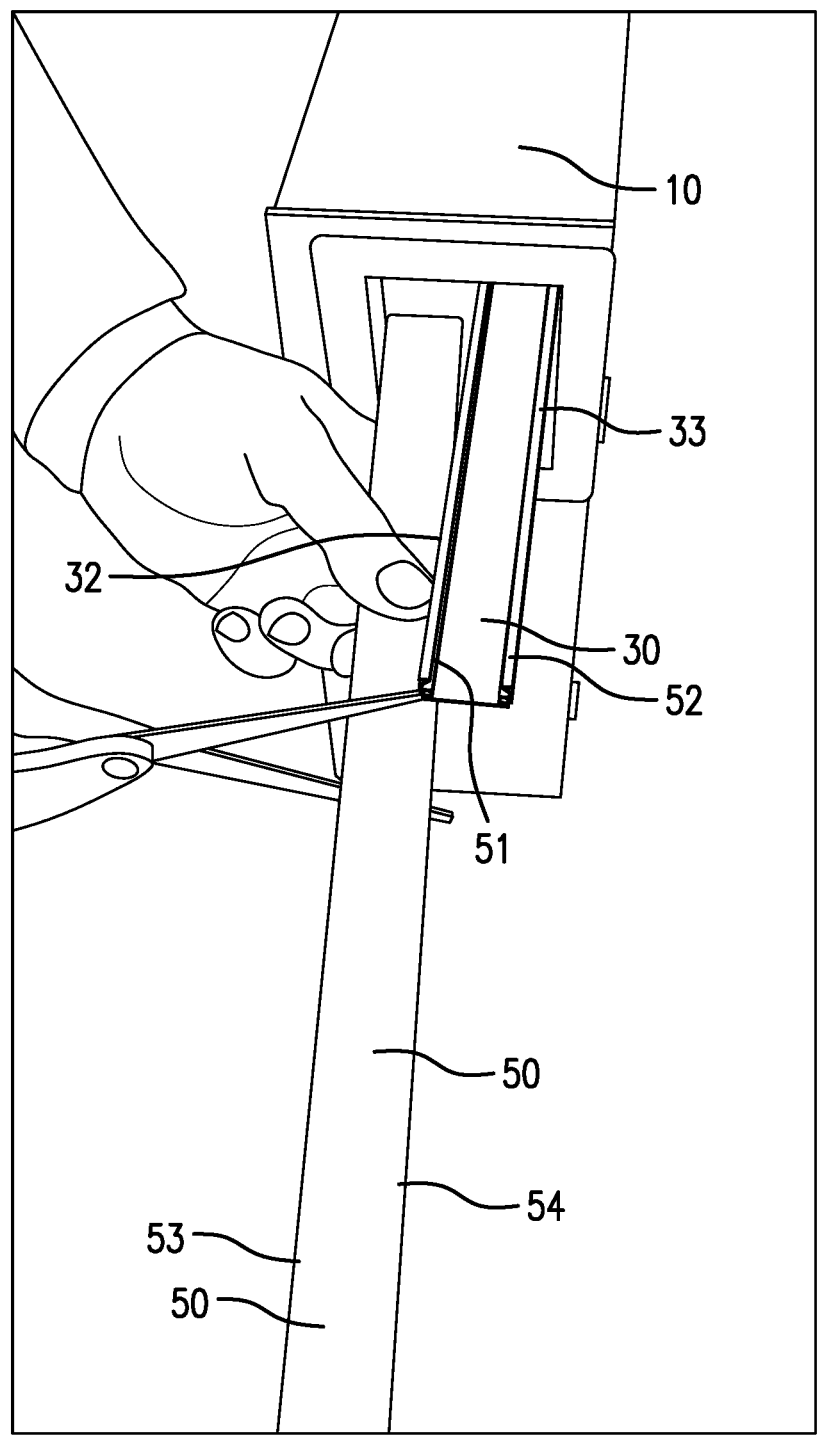
FIG. 7B is a side view of the kit including the device for dispensing a wire management system during use including cutting of a predetermined portion of the cover.

FIGS. 7A-7F illustrate kit 20 during use. Base 30 and cover 50 can be dispensed from device for dispensing a wire management system 10 by pulling on respective base 30 and cover 50 as shown in FIG. 7A. For example, any length of base 30 and cover 50 can be used such as a length in the range of six inches to twenty five feet. Base 30 and cover 50 can be cut to a pre-determined length, as shown in FIG. 7B, to be used to cover various arrangements of cords. For example, the cord can be an electrical cord or a cable. In this embodiment, base 30 can be dispensed from dispensing a wire management system 10 in a flat form. The flat form can make it easier to cut base 30 and provides accuracy for the cut.

Figure 7C:
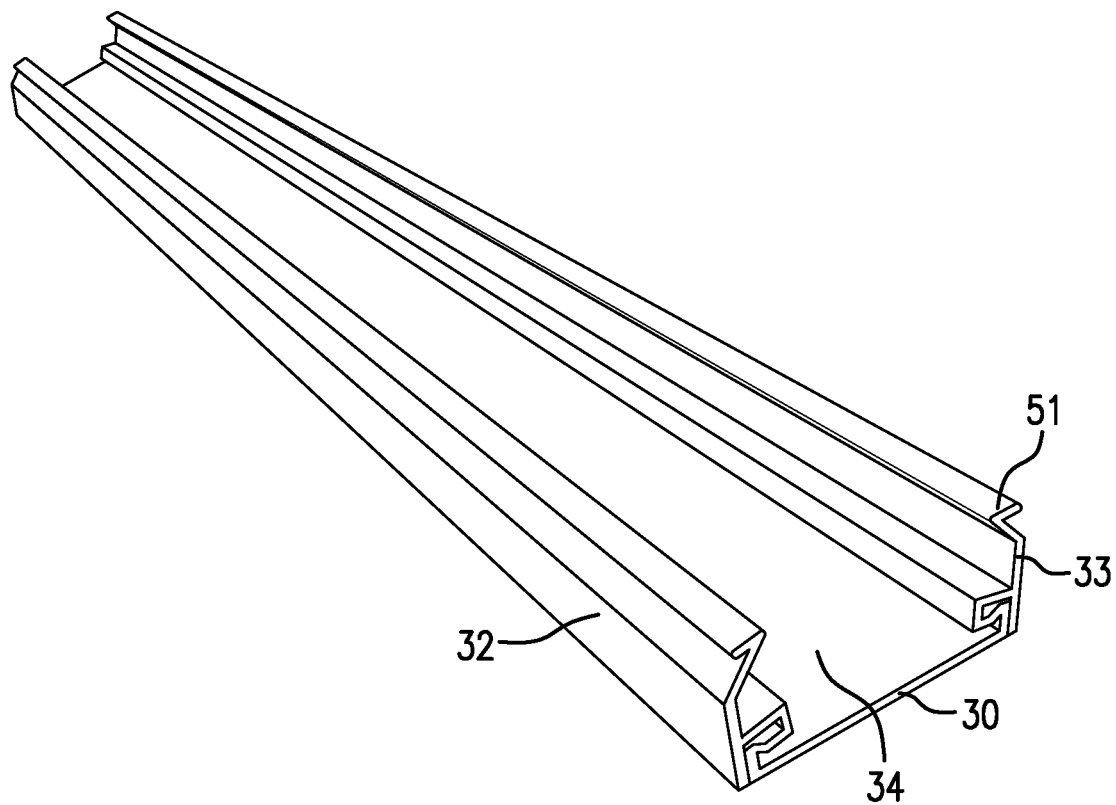
FIG. 7C is a top view during forming of the base.
Figure 7D:
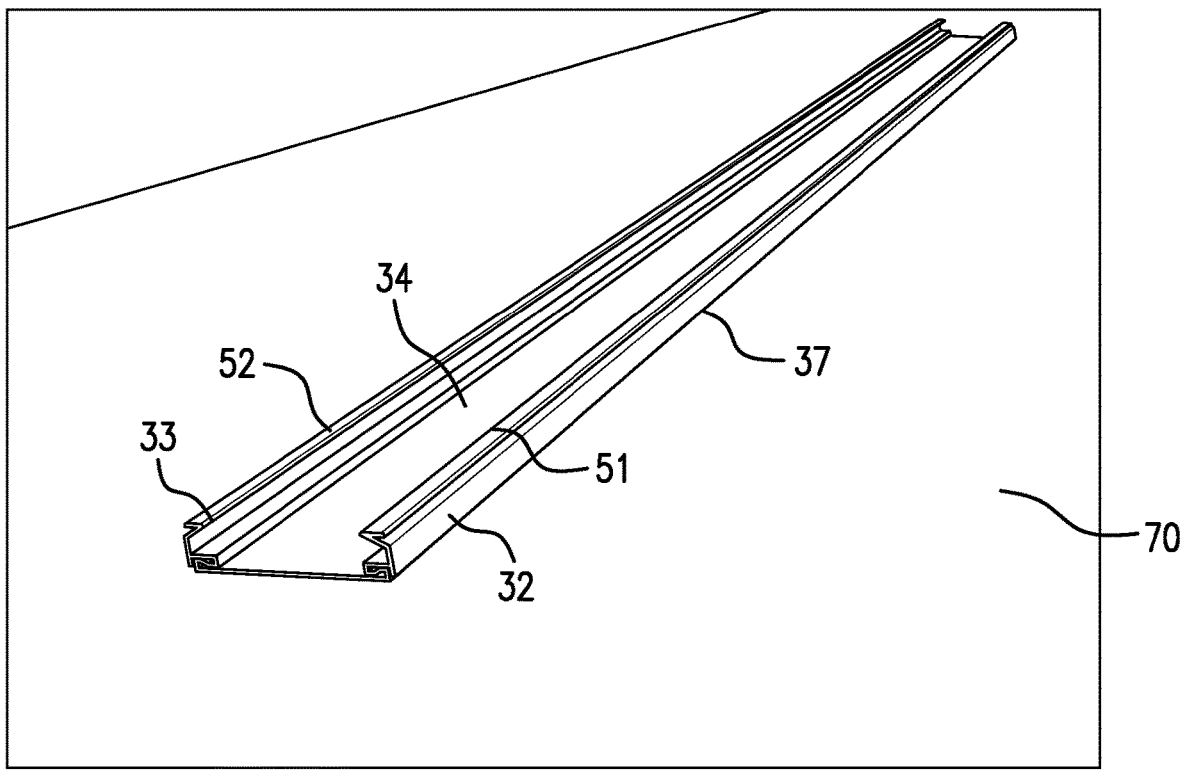
FIG. 7D is a top view during use of the kit including adhering of the base to a surface.

During dispensing of base 30, if base 30 was dispensed in flat form, side wall 32 and side wall 33 are bent upwardly from rear wall 31 to form cavity 34 as shown in FIG. 7C. During use, adhesive liner 39 can be removed from adhesive strip 37. Adhesive strip 37 is applied to surface 70 as shown in FIG. 7D.

Figure 7E:
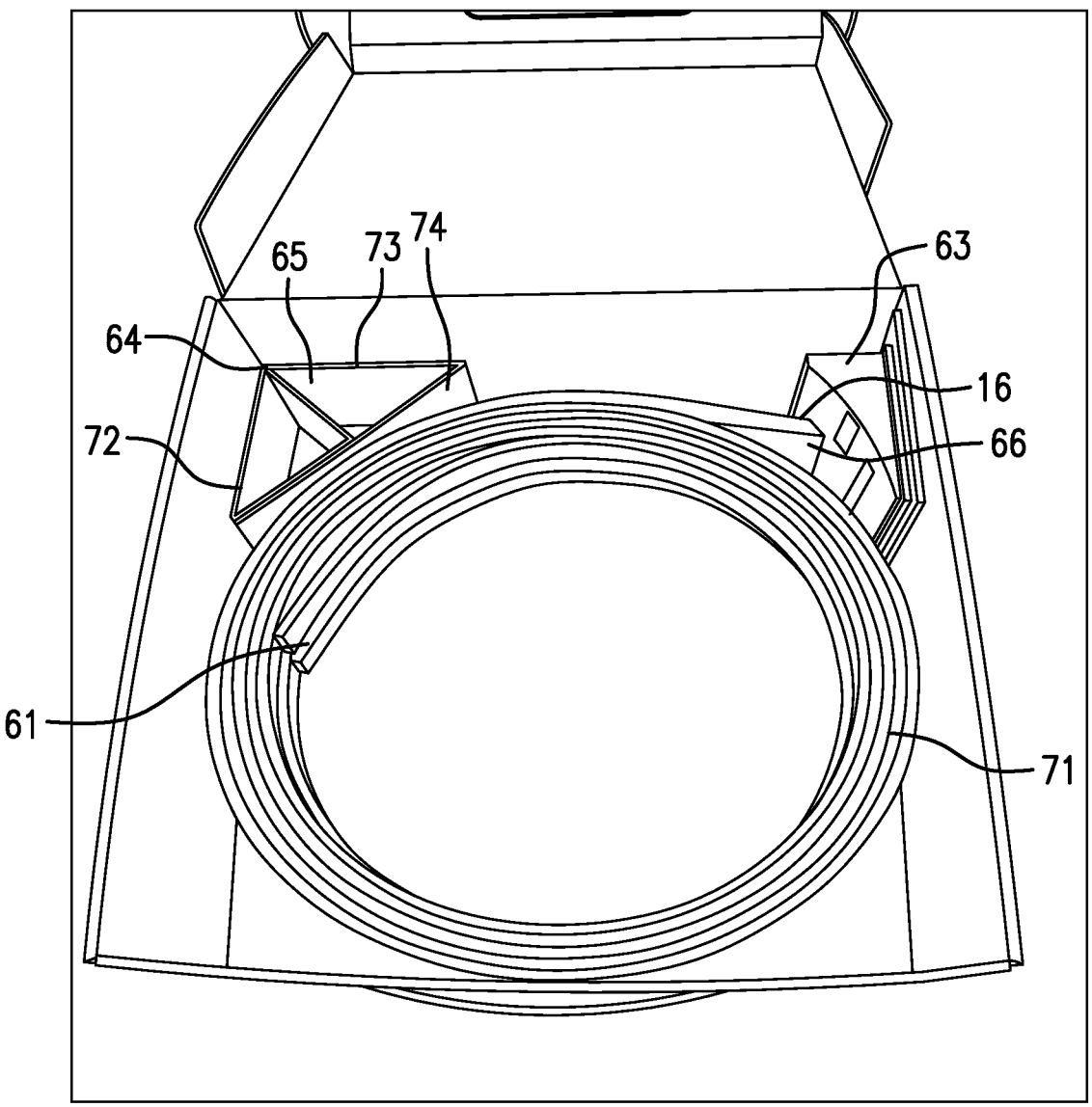
FIG. 7E is a top view during use of the kit showing the base within the kit and the self-forming of the base with a dispensing unit.
Figure 7F:
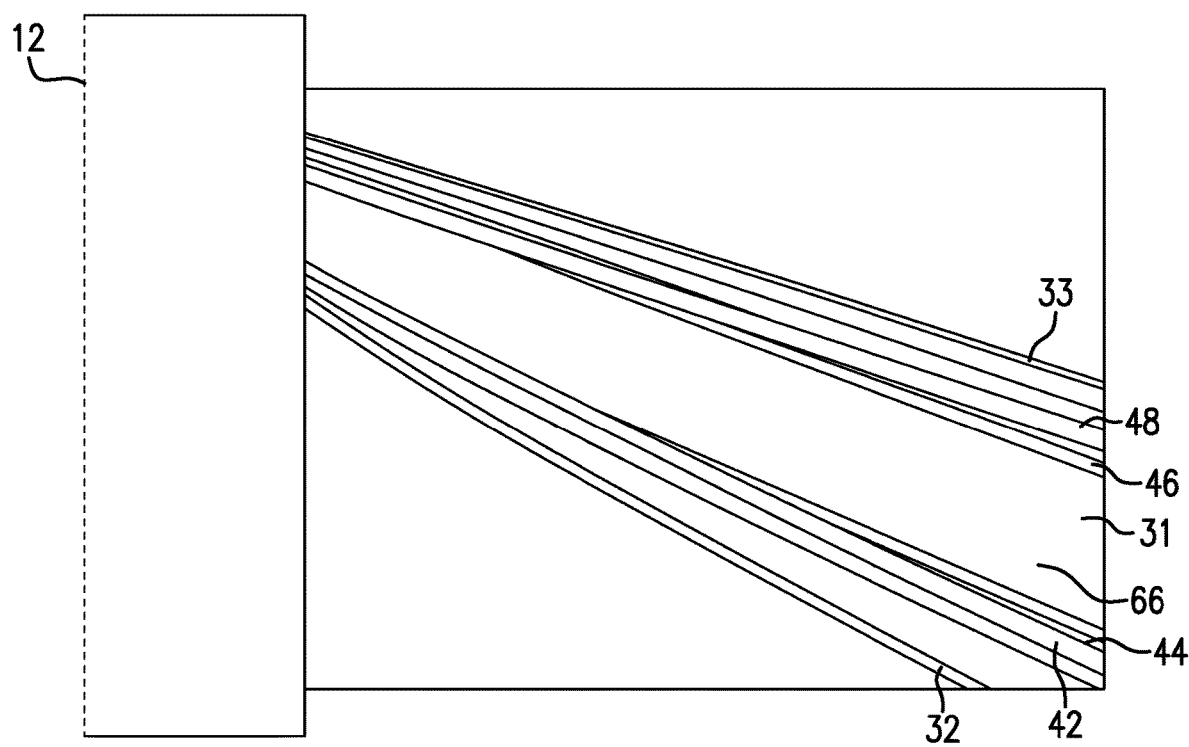
FIG. 7F is a side view of the base after being dispensed from the dispenser unit.

FIGS. 7E-7F illustrate an embodiment in which base 30 self-forms from dispenser housing 12 with a zipping action into a form including side wall 32 and side wall 33 extending upwardly from rear wall 31 to form cavity 34 as shown in FIG. 3. Referring to FIG. 7E, roll 71 of base 30 includes end 66 rolled around end 61. End 66 of roll 71 of base 30 is received in opening 21 of dispensing unit 16. Dispensing unit 16 is positioned in corner 63 of dispenser housing 12. End 66 of roll 71 of base 30 can be dispensed from dispensing unit 16 as shown in FIG. 7F. Coupler 42 and coupler 44 can engage one another to latch side wall 32 to rear wall 31. Coupler 46 and coupler 48 can engage one another to latch side wall 33 to rear wall 31.

Figure 7G:
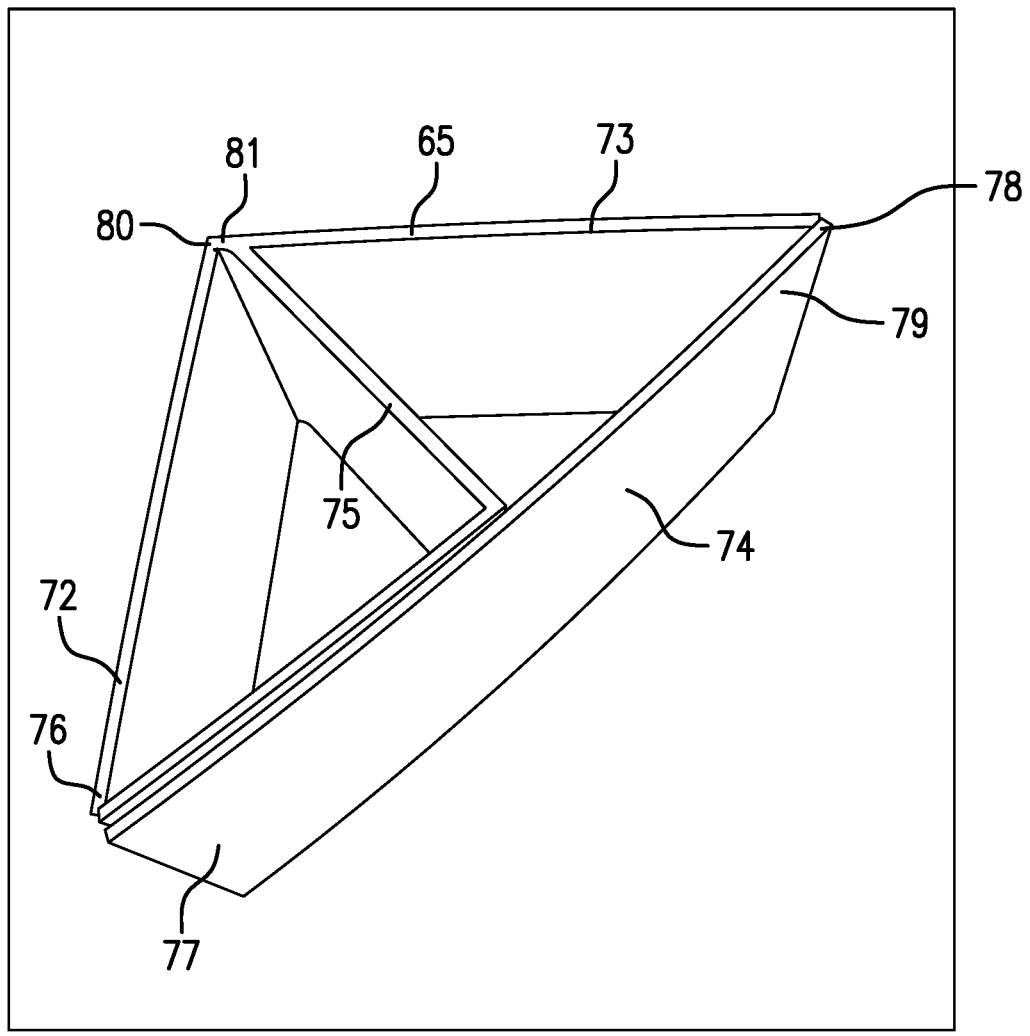
FIG. 7G is a top and side view of a dispenser support for supporting a roll of the base within the kit.

Referring to FIG. 7E roll support 65 can be positioned in corner 64 of dispenser housing 12. Corner 64 is opposite corner 63. Roll support 65 can be formed of side 72, side 73 and base 74 as shown in FIG. 7G. Support 75 can connect side 72, side 73 and base 74. End 76 of side 72 can be coupled or integral with end 77 of base 74. End 78 of side 73 can be coupled or integral with end 79 of base 74. End 80 of side 72 can be coupled or integral with end 81 of side 73. Roll support 65 can have a triangular shape such that side 72 and side 73 are adjacent corner 64 and base 74 is adjacent roll 71 as shown in FIG. 7E. Roll support 65 can prevent roll 71 from kinking in corner 64 and aid in a recoiling process during push back of base 30 into dispenser housing 12.

Figure 7H:
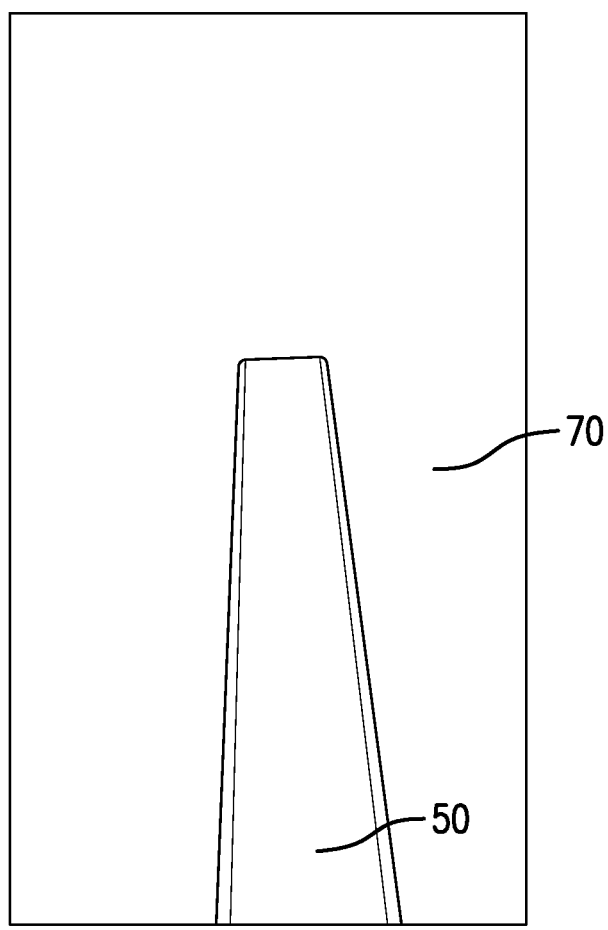
FIG. 7H is a top view and end view of the cover.
Figure 7I:
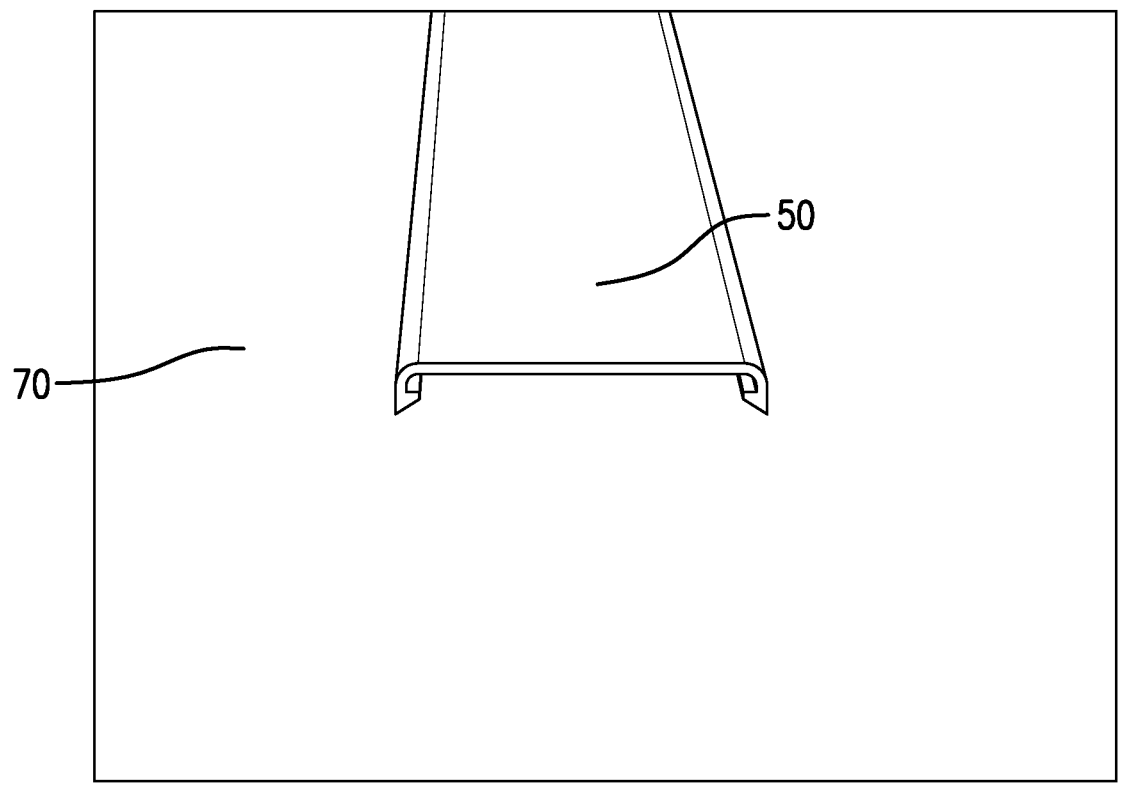
FIG. 7I is a top view of the cover after attachment to the base.
Figure 7J:
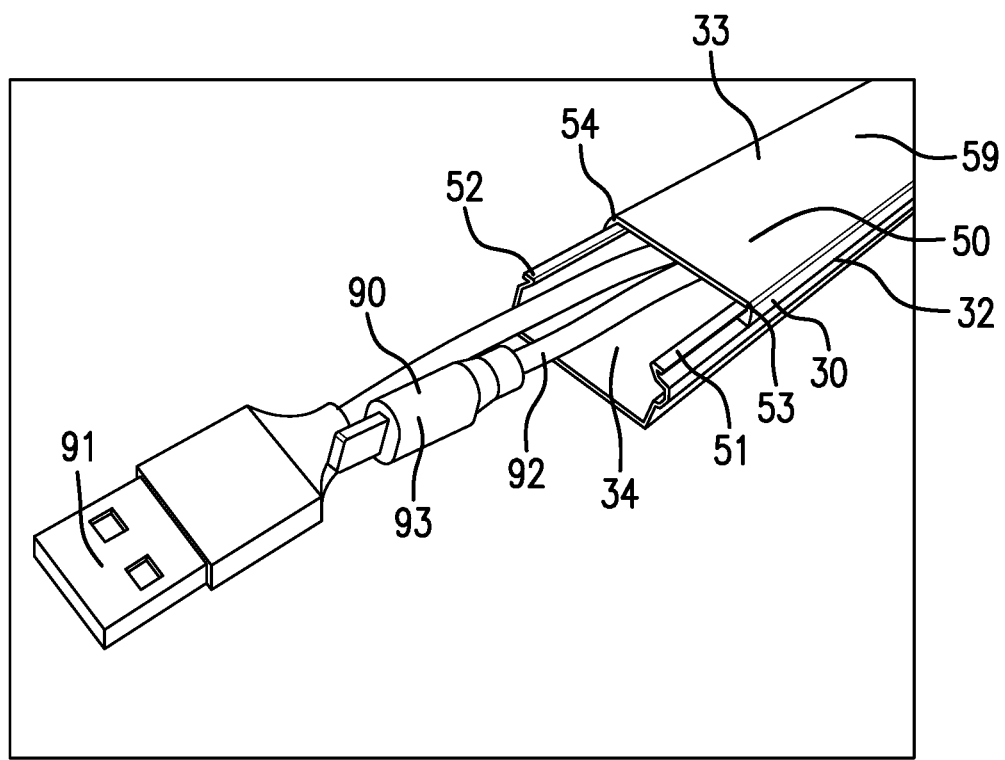
FIG. 7J is a top and side view during use of the kit including receiving wires in the wire management system.

Cover 50, shown in FIGS. 7H and 7I, is coupled to base 30 as shown in FIG. 7I. In one embodiment, lip 51 of side wall 32 of base 30 is received within lip 53 of cover 50. Lip 52 of side wall 33 of base 30 is received within lip 54 of cover 50 as shown in FIG. 7J.

The combination of cover 50 attached to base 30 forms wire management system 59. Cord 90 and cord 92 can be received and retained within cavity 34. Cord 90 can include adapter 91. Cord 92 can include adapter 93. It will be appreciated that various numbers of cords having various adapters can be received and retained within wire management system 59. Cord 90 and cord 92 can be removed from wire management system 59 by sliding cord 90 and cord 92 from wire management system 59. Cord 90 and cord 92 can also be removed from cavity 34 by sliding off cover 50. After removal of cord 90 and cord 92 from base 30, base 30 can be removed from surface 70.

Figure 7K:
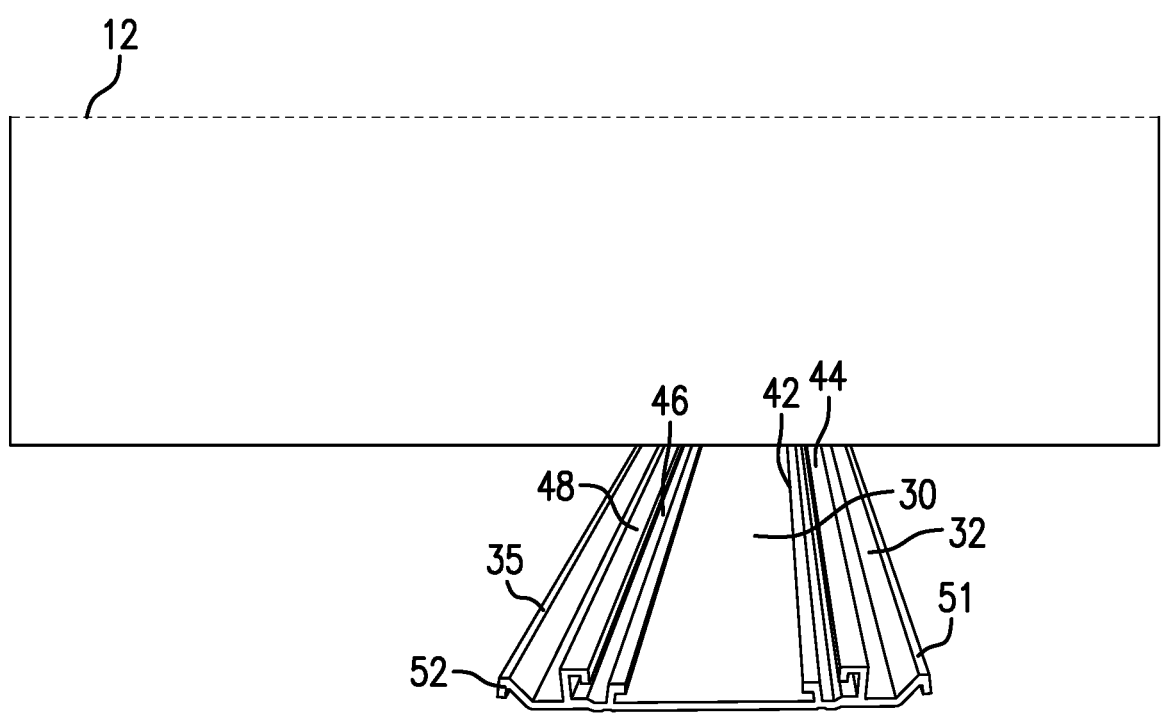
FIG. 7K is a top view during use of the kit including unzipping of the base into a flat form.

After dispensing of a pre-determined portion of base 30, the remaining base 30 which includes at least a portion which is in an un-latched state along the length of base 30 can be received back into dispenser housing 12 with an un-zipping action in order to flatten base 30 into a flat form as shown in FIG. 7K.

Figure 8:
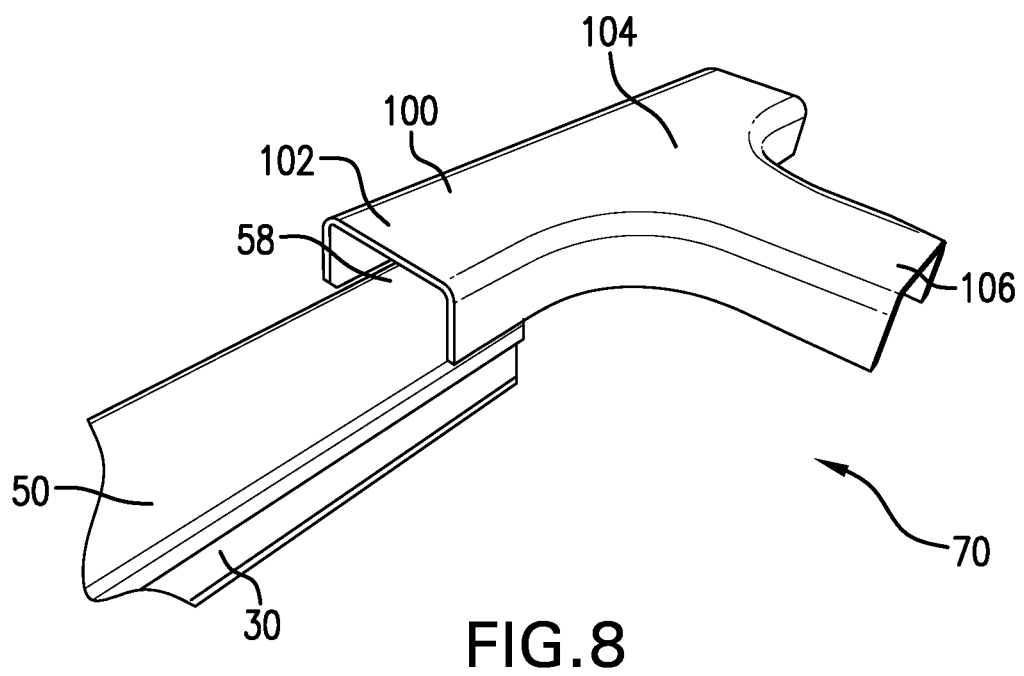
FIG. 8 is a top and side view of an attachment which can be used in the kit of the wire management system.
Figure 9:
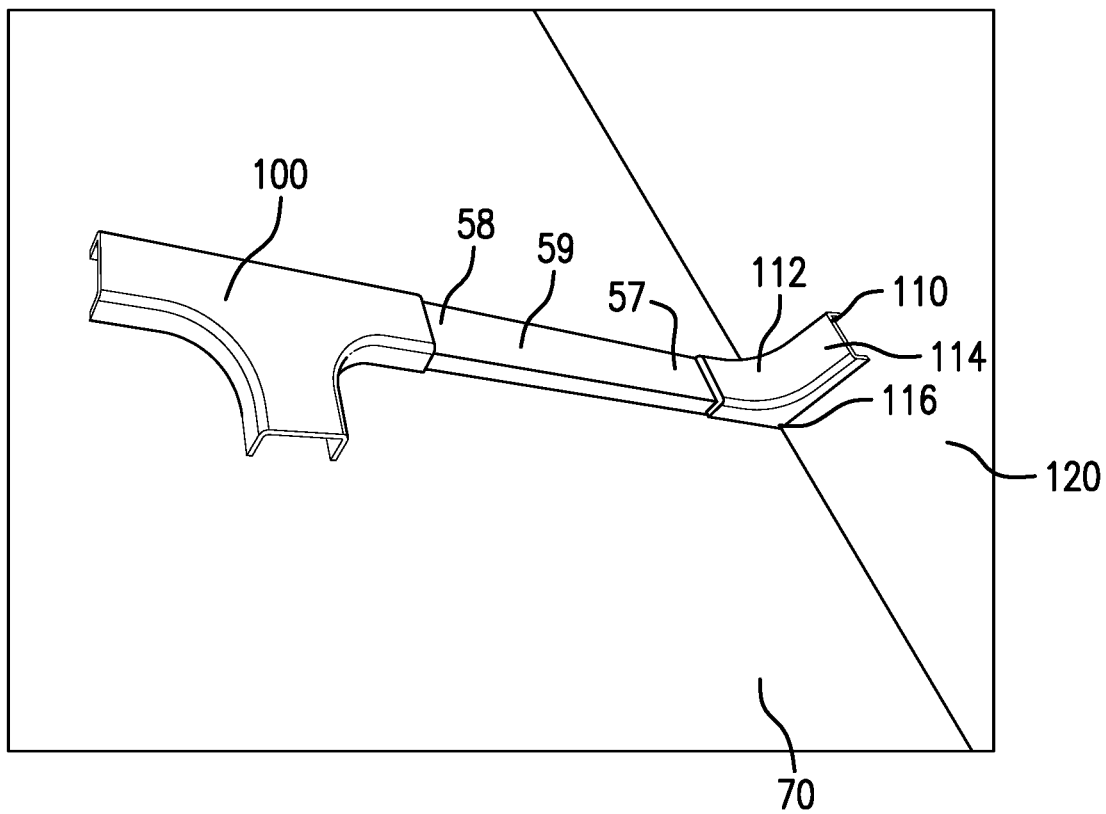
FIG. 9 is a top and side view of an attachment which can be used in the kit of the wire management system.

In one embodiment, fitting 100 can be used with kit 20. Fitting 100 can be removably attached to wire management system 59 as shown in FIG. 8. Fitting 100 includes end 102, end 104 and end 106. End 102, end 104 and end 106 can be coupled or integral to one another to form fitting 100 having a T shape. End 102 of fitting can be coupled to end 58 of wire management system 59. In one embodiment, end 102 of fitting 100 is snap-fit onto end 58 of wire management system 59.

In one embodiment, angled fitting 110 can be used with kit 20. Angled fitting 110 can be removably attached to wire management system 59 as shown in FIG. 8. Fitting 110 includes end 112 and end 114 coupled or integral with joint 116. End 112 can be angled from end 114 at a pre-determined angle. For example, end 112 can be angled 90 degrees from end 114. End 112 of angled fitting 110 can be coupled to end 57 of wire management system 59. End 112 can be adhered to surface 70 and end 114 can be adhered to surface 120. For example surface 70 can be a wall and surface 120 can be a ceiling. Alternatively, surface 70 can be a floor and surface 120 can be a wall. In one embodiment, end 112 of fitting 110 is snap-fit onto end 57 of wire management system 59.

Figure 10A:
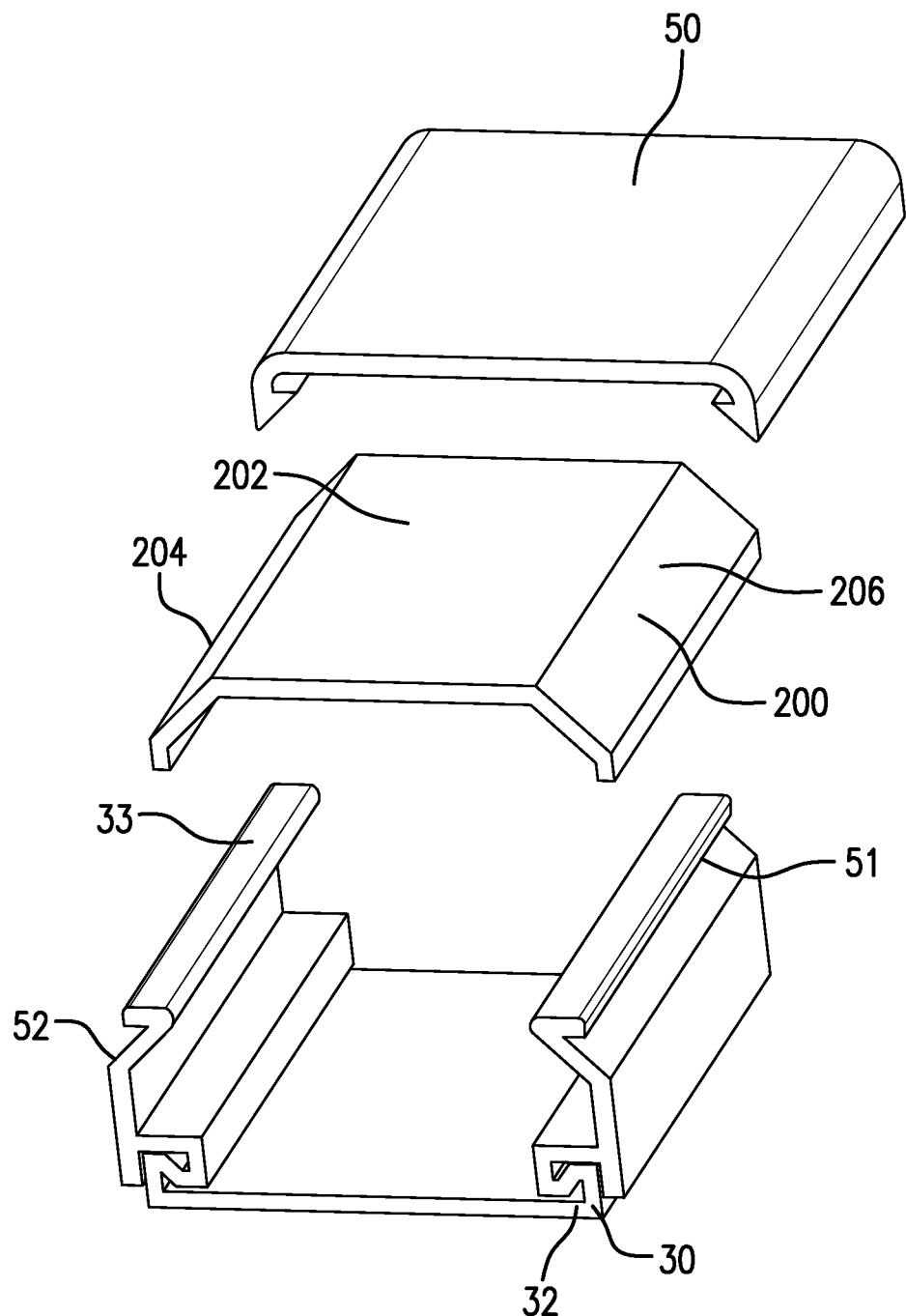
FIG. 10A is a top and side view of a wire retainer which can be used in the kit of the wire management system.
Figure 10B:
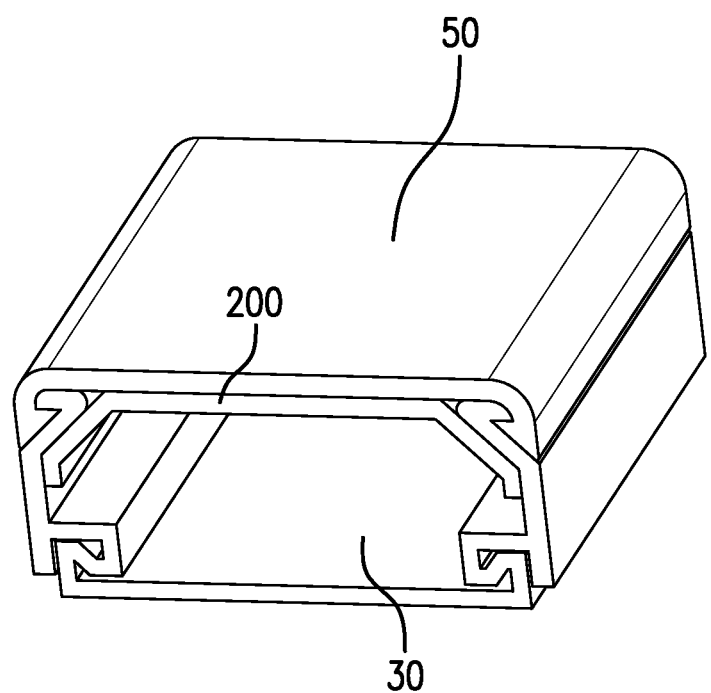
FIG. 10B is a top and side view of the wire retainer which has been snapped within the base and the cover.

In one embodiment, wire retainer 200 can be used with kit 20. Wire retainer 200 can be used to hold wires in place within base 30 before cover 50 is coupled to base 30 as shown in FIG. 10A. Wire retainer 200 includes side wall 204 and side wall 206 coupled or integral with rear wall 202. Side wall 204 is received over lip 51 of side wall 32 of base 30. Side wall 204 is received within lip 53 of cover 50. Side wall 206 is received over lip 52 of side wall 33 of base 30. Side wall 206 is received within lip 54 of cover 50. Wire retainer 200 can be snap fit to base 30 and cover 50 can be snap fit over wire retainer 200 as shown in FIG. 10B.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed:

1. A device for dispensing a wire management system comprising:
   a dispenser housing, the dispenser housing comprising a plurality of sides extending from a bottom to form a cavity and a lid, the lid extending or integral with one of the sides, said lid being moveable to open and close the dispenser housing, the dispenser housing system is configured to receive a wire management system and
   a dispensing unit being positioned on one of the sides of the dispenser housing, the dispensing unit configured to have at least one dispenser opening wherein the dispensing, unit includes a first of the openings and a second of the opening a base of the wire management system being dispensed from the first of the of the dispenser openings and a cover e wire management system being dispensed from the second of the dispenser openings.

2. The device of claim 1 further comprising:
a separation wheel positioned within the cavity of the dispenser housing, the separation wheel is configured to be positioned between the base and the cover, wherein the base is wound in a first roll and the first roll is positioned adjacent a top surface of the separation wheel and the cover is wound in a second roll and the second roll is positioned adjacent a bottom surface of the separation wheel, the separation wheel being rotated during dispensing of the base and/or the cover from dispenser housing.

3. The device of claim 2 wherein the separation wheel is rotated in a clockwise direction during dispensing of the base and/or the cover from the dispenser housing and the separation wheel rotates in a counterclockwise direction to recoil the base and/or the cover back into the dispenser housing.

4. The device of claim 1 further comprising:
a roll support, the roll support having a triangular shape, a first side and a second side of the roll support configured to be adjacent a corner formed by two of the sides of the dispenser unit which are adjacent to one another and a third side of the roll support configured to be adjacent the first roll and the second roll which are received in the dispenser unit.

5. The device of claim 1 further comprising a handle extending from one of the sides of the dispenser unit.

6. A device for dispensing a wire management system comprising:
a dispenser housing, the dispenser housing comprising a plurality of sides extending horn a bottom to form a cavity and a lid, the lid extending or integral with one of the sides, said lid being moveable to open and close the dispenser housing,
a dispensing unit being positioned on one of the sides of the dispenser housing the dispensing unit configured to have it least one dispenser opening; and a handle extending from one of the sides of the dispenser unit wherein a lid opening is formed in the lid, in a closed position of the lid the handle extends through the lid opening to snap close the lid.

7. A kit comprising:
a device far dispensing a wire management system, the device comprising a dispenser housing, the dispenser housing comprising a plurality of sides extending from a bottom to form a cavity and a lid, the lid extending or integral with one of the sides, the lid being moveable to open and close the dispenser housing, and a dispensing unit being positioned on one of the sides of the dispenser housing, the dispensing unit having a first dispenser opening and a second dispenser opening;
a first roll of a base of a wire management system; and
a second roll of a cover of the wire management system, wherein an end of the first roll is dispensed from the first dispenser opening and an end of the second roll is dispensed from the second dispenser opening.

8. The kit of claim 7 further comprising:
a separation Wheel positioned within the cavity of the dispenser housing, the separation wheel is configured to be positioned between the first roll of the base and the second roll of the cover, wherein the first roll of the base is positioned adjacent a top surface of the separation wheel and the second roll of the cover is positioned adjacent a bottom surface of the separation wheel, the separation wheel being rotated during dispensing of the base and/or the cover from dispenser housing.

9. The kit of claim 8 wherein the separation wheel rotates in a clockwise direction during dispensing of the first roll of the base and the second roll of the cover from the dispenser housing and the separation wheel rotates in a counterclockwise direction to recoil the first roll of the base and the second roll of the cover back into the dispenser housing.

10. The kit of claim 7 further comprising a roll support, the roll support having a triangular shape, a first side and a second side of the roll support configured to be adjacent a cornier formed by two of the sides of the dispenser unit which are adjacent to one another and a third side of the roll support configured to be adjacent the first roll of the base and the second roll of the cover.

11. The kit of claim 7 further comprising a handle extending from one of the sides of the dispenser unit.

12. The kit of claim 11 wherein a lid opening is formed in the lid, in a closed position of the ltd the handle extends through the lid opening to snap close the lid.

13. The kit of claim 7 wherein the base comprises a rear wall coupled or integral with a pair of side walls, wherein the base is in a flat form within the dispenser housing and during dispensing of the base from the dispenser housing, the base self-forms with a zipping action such that the side walls extend upwardly from the rear wall.

14. The kit of claim 13 wherein the side walls are coupled to the rear wall with a coupler, the coupler is latched to lock the side walls to the rear wall after the base self-forms.

15. The kit of claim 14 wherein after dispensing of a pre-determined portion of the base, the remaining base, having at least a portion that is not latched, is received back into the dispenser housing with an un-zipping action to flatten the base into a flat form within the dispenser housing.

16. The kit of claim 13 further comprising a wire retainer configured to hold wires in place within the base before the cover is coupled to base, the wire retainer being snap fit to base and the cover being snap fit over the wire retainer.

17. The kit of claim 7 wherein an adhesive material is attached or coated on an outer surface of a rear wall of the base.

18. The kit of claim 17 further comprising a removable liner placed over adhesive material.

19. The kit of claim 7 further comprising one or more fittings, the one or more fittings being an angle shaped fitting or a T shaped fitting.

20. A method of dispensing a wire management system comprising:
providing a kit comprising a device for dispensing a wire management system, the device comprising a dispenser housing, the dispenser housing comprising a plurality of sides extending from a bottom to form a cavity and a lid, the lid extending or integral with one of the sides, the lid being moveable to open and close the dispenser housing,
a dispensing unit being positioned on one of the sides of the dispenser housing, the dispensing unit having a first dispenser opening and a second dispenser opening, a first roll of a base of a wire management system and a second roll of a cover of the wire management system;
dispensing the base and/or the cover from the dispensing unit by pulling on a respective end of the roll of the base and/or the roll of the cover to dispense the base and/or the cover from the respective first dispenser opening or the second dispenser opening, wherein the base includes a pair of side walls coupled or integral with a rear wall, the base can be dispensed in flat form of the side walls and the rear wall and after dispensing of the base, the side walls being folded upwardly to create a cavity between the side walls.

21. The method of claim 20 wherein the base includes an adhesive material adhered to an outside surface of the rear wall and having a liner attached to the adhesive material; further comprising the steps of after a predetermined portion of the base and the cover is dispensed, cutting of the base and the cover to a pre-determined length;

removing the liner from the adhesive material;
applying the adhesive layer to a surface;
receiving a cord in the cavity of the base; and coupling the cover to the base.

* * * * *